(12) United States Patent
Münzmay et al.

(10) Patent No.: US 8,063,138 B2
(45) Date of Patent: Nov. 22, 2011

(54) AQUEOUS PU DISPERSIONS WITH IMPROVED ADHESION

(75) Inventors: Thomas Münzmay, Dormagen (DE); Torsten Pohl, Pittsburgh, PA (US); Uwe Klippert, Burscheid (DE)

(73) Assignee: Bayer MaterialScience AG, Leverkusen (DE)

( * ) Notice: Subject to any disclaimer, the term of this patent is extended or adjusted under 35 U.S.C. 154(b) by 464 days.

(21) Appl. No.: 11/827,252

(22) Filed: Jul. 11, 2007

(65) Prior Publication Data

US 2008/0035024 A1      Feb. 14, 2008

Related U.S. Application Data

(63) Continuation-in-part of application No. 11/080,278, filed on Mar. 14, 2005, now abandoned.

(30) Foreign Application Priority Data

Mar. 18, 2004   (DE) .................. 10 2004 013 259

(51) Int. Cl.
*C08G 18/08* (2006.01)
*C09K 3/00* (2006.01)

(52) U.S. Cl. .............. 524/589; 524/591; 106/287.25

(58) Field of Classification Search .......... 524/589, 524/591; 106/287.25
See application file for complete search history.

(56) References Cited

U.S. PATENT DOCUMENTS

| | | | |
|---|---|---|---|
| 3,552,999 A | 1/1971 | Shima et al. | 117/76 |
| 3,617,352 A | 11/1971 | Shima et al. | 117/76 |
| 3,890,264 A | 6/1975 | Sidi et al. | 260/29.6 MN |
| 3,905,929 A | 9/1975 | Noll | 260/29.2 TN |
| 4,237,264 A | 12/1980 | Noll et al. | 528/67 |
| 5,331,039 A | 7/1994 | Blum et al. | 524/507 |
| 5,569,707 A | 10/1996 | Blum et al. | 524/591 |
| 6,254,937 B1 | 7/2001 | Schafheutle et al. | 427/388.2 |
| 6,426,414 B1 | 7/2002 | Laas et al. | 544/222 |
| 6,677,400 B2 | 1/2004 | Münzmay et al. | 524/839 |
| 6,767,958 B2 | 7/2004 | Laas et al. | 524/840 |
| 2003/0049457 A1 | 3/2003 | Munzmay et al. | 428/422.8 |
| 2004/0034162 A1 | 2/2004 | Laas et al. | 524/589 |

FOREIGN PATENT DOCUMENTS

DE    100 07 821    8/2001

OTHER PUBLICATIONS

Justus Liebigs, Annalen der Chemie, 562, (month unavailable) 1949, pp. 75-136, Von Werner Siefken, "Mono- und Polyisocyanate".
Houben-Weyl Methoden der Organichen Chemie, vol. E20, (month unavailable) 1987, pp. 1670-1681, D. Dieterich, Poly(urethane).

*Primary Examiner* — Mark Eashoo
(74) *Attorney, Agent, or Firm* — Connolly Bove Lodge & Hutz LLP

(57) ABSTRACT

A process for preparing polyester-polyurethane resin dispersions comprising:
A) reacting
  i) one or more polyol components having a number average molecular weight of at least 300 daltons, at least 60% by weight of component i) being a polyester polyol with the fraction of aromatic carboxylic acid groups relative to all of the carboxylic acid groups used to prepared said polyester polyol being at least 60 mol %,
  ii) optionally one or more polyol components having a number average molecular weight of 62 to 299 daltons, and
  iii) optionally a compound which is monofunctional for the purposes of the isocyanate polyaddition reaction and has an ethylene oxide content of at least 50% by weight and a number average molecular weight of at least 400 daltons, with
  iv) a polyisocyanate to form a prepolymer,
B) dissolving the prepolymer in an organic solvent,
C) reacting the prepolymer with v) one or more aliphatic and/or alicyclic primary and/or secondary polyamines having a number average molecular weight of 60 to 300 daltons, said polyamine optionally being in combination with hydrazine or hydrazine hydrate, and vi) a hydrophilicized aliphatic diamine,
D) precipitating the product from C) by adding water to form a dispersion, and
E) removing the organic solvent.

8 Claims, No Drawings

AQUEOUS PU DISPERSIONS WITH IMPROVED ADHESION

CROSS REFERENCE TO RELATED PATENT APPLICATION

The present application is a continuation-in-part of U.S. application Ser. No. 11/080,278, filed on Mar. 14, 2005 now abandoned. U.S. application Ser. No. 11/080,278 claims the right of priority under 35 U.S.C. §119 (a)-(d) of German Patent Application No. 10 2004 013 259.3, filed Mar. 18, 2004.

BACKGROUND OF THE INVENTION

1. Field of the Invention

The invention relates to new aqueous polyester-polyurethane dispersions, to coating compositions comprising these dispersions and to the coating materials prepared therefrom.

2. Description of the Prior Art

Ionically modified polyurethane dispersions and their aqueous formulations are known prior art. One important field of use of aqueous formulations of ionically modified polyurethanes lies in the area of the coating of plastics components.

For years the efforts at weight saving in the passenger car have gone hand in hand with increased use of plastic, in the interior as well. Because of aesthetic and technical requirements, plastics components in the car are normally coated, in order to protect the plastic against external influences, such as sunlight, chemical, thermal and mechanical exposure, in order to obtain certain shades and colour effects, in order to mask defects in the plastic surface or in order to give the plastic surface a pleasant feel (tactility). In order to enhance the tactile properties of plastics components in the car interior, use has been made increasingly in recent years of what are called soft feel coating materials. "Soft feel effect" for the purposes of the present invention denotes a particular tactual sensation (tactility) of the coated surface. This tactility can be described using terms such as velvety, soft, rubber-like or warm, whereas, for example, the surface of a painted car body or else an unpainted polymer sheet or one coated with a customary clearcoat or topcoat material and made, for example, of ABS, Makrolon® (polycarbonate, Bayer AG) or plexiglass feels cold and smooth.

In tune with the trend of avoiding solvent emissions to the environment, recent years have seen the establishment of aqueous soft feel coating materials based on the polyurethane chemistry, as disclosed, by way of example, in DE-A1 44 06 159. As well as an excellent soft feel effect, these coating materials also produce coatings having good resistance and protective effect for the plastics substrate.

It has since been found, however, that even these coating materials do not have adequate adhesion to numerous plastics substrates. In order to remove this drawback, the coating system on high-grade plastics parts according to the present prior art is effected with two or three coats. A coating system of this kind is composed of primer, optionally a basecoat and a topcoat. The primer in this system takes on the function of the adhesion promoter between substrate and coating material.

Accordingly, within the field of the coating of plastics components, there is a demand for products which have not only good soft feel properties but also good adhesion to the substrates. These products can then be used without a primer in a single-coat system.

DE-A1 2 651 506 discloses a process for preparing water-dispersible polyurethanes. The products of this process, however, are unsuitable for use as a single-coat soft feel coating material for plastics components, since they lack the necessary adhesion properties.

Likewise, soft feel coating materials are described in DE-A1 44 06 159. Therein, however, satisfactory adhesion properties of the coating films are not obtained.

The teaching of DE-A1 101 38 765 discloses that the use of polyethers prepared starting from aromatic diols in aqueous polyurethane (PU) dispersions leads to products which in view of their improved adhesion to a variety of substrates are suitable as priming binders. Because of their inadequate tactility, however, the products are not suitable for use as soft feel coating materials.

An object of the present invention was to provide aqueous polyurethane dispersions which have suitability as soft feel coating materials and at the same time have excellent adhesion to plastics substrates.

SUMMARY OF THE INVENTION

The present invention is directed to a process for preparing polyester-polyurethane resin dispersions. The process comprises A) reacting
  i) one or more polyol components having a number average molecular weight of at least 300 daltons, at least 60% by weight of component i) being a polyester polyol with the fraction of aromatic carboxylic acid groups relative to all of the carboxylic acid groups used to prepared said polyester polyol being at least 60 mol %,
  ii) optionally one or more polyol components having a number average molecular weight of 62 to 299 daltons, and
  iii) optionally a compound which is monofunctional for the purposes of the isocyanate polyaddition reaction and has an ethylene oxide content of at least 50% by weight and a number average molecular weight of at least 400 daltons, with
  iv) a polyisocyanate to form a prepolymer,
B) dissolving the prepolymer in an organic solvent,
C) reacting the prepolymer with v) one or more aliphatic and/or alicyclic primary and/or secondary polyamines having a number average molecular weight of 60 to 300 daltons, said polyamine optionally being in combination with hydrazine or hydrazine hydrate, and vi) a hydrophilicized aliphatic diamine,
D) precipitating the product from C) by adding water to form a dispersion, and
E) removing the organic solvent.

The present invention further provides polyester-polyurethane resin dispersions obtained according to the above-described process.

The present invention also provides coating compositions that comprises 15 to 45 parts by weight of the above-described aqueous polyester-polyurethane resin dispersion, 15 to 45 parts by weight of a hydroxy-functional, aqueous or water-dilutable binder, 0 to 60 parts by weight of an inorganic filler and/or matting agent, 1 to 60 parts by weight of a polyisocyanate, 0.1 to 30 parts by weight of pigments and 1 to 15 parts by weight of customary coatings auxiliaries, the sum of the components totalling 100.

The present invention additionally provides a coating system that includes a substrate and one or more coating films, where at least one of the coating films includes the above-described polyester-polyurethane resin dispersion.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that polyurethane dispersions comprising polyester polyols, including a fraction of more than 60% by weight of polyester polyols based on aromatic dicarboxylic acids, substantially enhance the adhesion properties of the coatings producible therewith on plastics substrates.

The present invention provides a process for preparing polyester-polyurethane resin dispersions comprising A) reacting
  i) one or more polyol components having a number average molecular weight of at least 300 daltons, at least 60% by weight of component i) being a polyester polyol with the fraction of aromatic carboxylic acid groups relative to all of the carboxylic acid groups used to prepared said polyester polyol being at least 60 mol %,
  ii) optionally one or more polyol components having a number average molecular weight of 62 to 299 daltons, and
  iii) optionally a compound which is monofunctional for the purposes of the isocyanate polyaddition reaction and has an ethylene oxide content of at least 50% by weight and a number average molecular weight of at least 400 daltons, with
  iv) a polyisocyanate to form a prepolymer,
B) dissolving the prepolymer in an organic solvent,
C) reacting the prepolymer with v) one or more aliphatic and/or alicyclic primary and/or secondary polyamines having a number average molecular weight of 60 to 300 daltons, said polyamine optionally being in combination with hydrazine or hydrazine hydrate, and vi) a hydrophilicized aliphatic diamine,
D) precipitating the product from C) by adding water to form a dispersion, and
E) removing the organic solvent.

Likewise provided by the present invention are the polyester-polyurethane resin dispersions obtainable in accordance with the process of the invention.

In the context of the invention the term "polyurethane" also embraces "polyurethane-polyureas", i.e. high molecular weight compounds containing not only urethane groups but also urea groups.

Synthesis components i) suitable for the aqueous polyester-polyurethane resin dispersions of the invention are organic compounds containing at least two free hydroxyl groups capable of reaction with isocyanate groups. Examples of compounds of this kind are relatively high molecular weight compounds from the classes of the polyester, polyester amide, polycarbonate, polyacetal and polyether polyols having number average molecular weights of at least 300, preferably 500 to 8000, more preferably 800 to 5000. Preferred compounds are for example those containing two hydroxyl groups (difunctional), such as polyester diols or polycarbonate diols. Particularly suitable polyester polyols are linear polyester diols or else polyester polyols with low degrees of branching, such as are preparable conventionally from aliphatic, cycloaliphatic and aromatic dicarboxylic or polycarboxylic acids and/or their anhydrides, such as succinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic or trimellitic acid and also acid anhydrides, such as o-phthalic, trimellitic or succinic anhydride, or a mixture thereof, and polyhydric alcohols, such as ethanediol, di-, tri- and tetraethylene glycol, 1,2-propanediol, di-, tri- and tetrapropylene glycol, 1,3-propanediol, butane-1,4-diol, butane-1,3-diol, butane-2,3-diol, pentane-1,5-diol, hexane-1,6-diol, 2,2-dimethyl-1,3-propanediol, 1,4-dihydroxycyclohexane, 1,4-dimethylolcyclohexane, octane-1,8-diol, decane-1,10-diol, dodecane-1,12-diol or mixtures thereof, with or without the use of polyols of higher functionality, such as trimethylolpropane or glycerol. Suitable polyhydric alcohols for preparing the polyester polyols i) also of course include cycloaliphatic and/or aromatic di- and polyhydroxyl compounds. In lieu of the free polycarboxylic acid it is also possible to use the corresponding polycarboxylic anhydrides or corresponding polycarboxylic esters of lower alcohols or mixtures thereof for preparing the polyesters i).

Other suitable polyol components include homopolymers or copolymers of lactones, which are obtained preferably by subjecting lactones or lactone mixtures, such as butyrolactone, $\epsilon$-caprolactone and/or methyl-$\epsilon$-caprolactone, to addition reactions with suitable starter molecules having a functionality of two and/or more, such as, for example, the low molecular weight polyhydric alcohols specified above as synthesis components for polyester polyols.

Hydroxyl-containing polycarbonates as well are suitable polyol components i); for example, those preparable by reacting diols such as 1,4-butanediol and/or 1,6-hexanediol with diaryl carbonates, such as diphenyl carbonate, dialkyl carbonate, such as dimethyl carbonate, or phosgene, and having a number average molecular weight of 800 to 5000.

Preferred are polyester polyols based on dicarboxylic acids or their anhydrides such as o-phthalic, isophthalic and terephthalic acid and glycols such as 1,4-butanediol, 1,6-hexanediol and/or 2,2-dimethyl-1,3-propanediol (neopentyl glycol). Particular preference is given to using the aromatic dicarboxylic acids or their anhydrides in a mixture with polyester diols based on adipic acid and glycols such as 1,4-butanediol, 1,6-hexanediol and/or 2,2-dimethyl-1,3-propanediol (neopentyl glycol). Likewise particularly preferred is the use of copolymers of 1,6-hexanediol with $\epsilon$-caprolactone and diphenyl carbonate or dimethyl carbonate, having a number average molecular weight of 1000 to 4000, and of polycarbonate diols having a number average molecular weight of from 1000 to 3000.

Preference is likewise given to copolymers of aromatic and aliphatic dicarboxylic acids or their anhydrides and the stated glycols.

Also suitable as components i) are polyether polyols, examples being the polyadducts of styrene oxides, ethylene oxide, propylene oxide, tetrahydrofuran, butylene oxide and epichlorohydrin, and also their mixed adducts and grafting products, and also the polyether polyols obtained by condensing polyhydric alcohols or mixtures thereof and the polyether polyols obtained by alkoxylating polyhydric alcohols, amines and amino alcohols.

It is essential to the invention that the fraction of aromatic carboxylic acid groups, relative to all of the carboxylic acid groups used to prepare the polyester component, in the polyol component i) is at least 60 mol %, preferably at least 70 mol % and more preferably at least 80 mol %. Based on the polyol component i) the fraction of polyester polyol based on aromatic polycarboxylic acids is preferably more than 60% by weight.

Suitable synthesis components ii) are diols having number average molecular weights of from 62 to 299. Suitable such compounds include for example the polyhydric alcohols, especially dihydric alcohols, stated for preparing the synthesis components i), and also, furthermore, low molecular weight polyester diols, such as, for example, bis(hydroxyethyl)adipate or short-chain homoadducts and mixed adducts of ethylene oxide or of propylene oxide, prepared starting from aromatic diols. Preferred synthesis components ii) are 1,2-ethanediol, 1,4-butanediol, 1,6-hexanediol and 2,2-dimethylpropane-1,3-diol. Particular preference is given to 1,4-butanediol and 1,6-hexanediol.

The polyester-polyurethane resin dispersions of the invention contain, based on solids, from 0% to 4% by weight of ethylene oxide units which are incorporated terminally and/or laterally and which, through the use of the synthesis components iii) in the course of the isocyanate polyaddition operation, can be incorporated in a simple way.

Hydrophilic synthesis components iii) for incorporating terminal hydrophilic chains containing ethylene oxide units are compounds of the formula (I)

$$H-Y'-X-Y-R \qquad (I)$$

in which

R is a monovalent hydrocarbon radical having 1 to 12 carbon atoms, preferably an unsubstituted alkyl radical having 1 to 4 carbon atoms, X is a polyalkylene oxide chain having 5 to 90, preferably 20 to 70, chain members, which is composed to an extent of at least 40%, preferably at least 65%, of ethylene oxide units and which in addition to ethylene oxide units may be composed of propylene oxide, butylene oxide or styrene oxide units, preference among the last-mentioned units being given to propylene oxide units, and Y/Y' is oxygen or else is —NR'—, R' corresponding in its definition to R or hydrogen.

Preferably, however, monofunctional synthesis components iii) are used only in molar amounts of ≦10 mol %, based on the polyisocyanate used, so as to ensure the desired high molecular weight construction of the polyurethane elastomers.

Where larger molar amounts of monofunctional alkylene oxide polyethers are used it is advantageous to use, as well, trifunctional compounds containing isocyanate-reactive hydrogen atoms, though with the proviso that the average of the functionality of the starting compounds i) to iii) is not greater than 2.7, preferably not greater than 2.3. The monofunctional, hydrophilic synthesis components are prepared in analogy to the manner described in DE-A 2 314 512 or DE-A 2 314 513 or in U.S. Pat. No. 3,905,929 or U.S. Pat. No. 3,920,598, by alkoxylating a monofunctional starter such as n-butanol or N-methylbutylamine, for example, using ethylene oxide and optionally a further alkylene oxide such as propylene oxide, for example.

Preferred synthesis components iii) are the copolymers of ethylene oxide with propylene oxide, which contain at least 50% by weight (and preferably from 55 to 89% by weight) of ethylene oxide.

One preferred embodiment uses as synthesis components iii) compounds having a number average molecular weight of at least 400 daltons, preferably at least 500 daltons and more preferably of 1200 to 4500 daltons.

Compounds suitable as synthesis components iv) are any desired organic compounds containing at least two free isocyanate groups per molecule, such as diisocyanates X(NCO)₂, where X is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Further examples of compounds which can be used as a diisocyanate component are described for example by W. Siefken in Justus Liebigs Annalen der Chemie, 562, pp. 75-136.

Examples of diisocyanates to be used with preference are tetramethylene diisocyanate, methylpentamethylene diisocyanate, hexamethylene 1,6-diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 2,2-bis(4-isocyanatocyclohexyl)propane, 1,4,-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, p-xylylene diisocyanate, 1,3- and 1,4-diisocyanatomethylbenzene, and mixtures of these compounds. Particular preference is given to hexamethylene 1,6-diisocyanate, 1-isocyanato-3,3,5-trimethyl-5-isocyanatomethylcyclohexane (isophorone diisocyanate) and 4,4'-diisocyanatodicyclohexylmethane.

It is of course also possible to use (as well), proportionally, the higher polyfunctional polyisocyanates known per se in polyurethane chemistry or else modified polyisocyanates known per se, examples being polyisocyanates containing carbodiimide groups, allophanate groups, isocyanurate groups, urethane groups and/or biuret groups.

Suitable synthesis components v) include aliphatic and/or alicyclic primary and/or secondary polyamines, preference being given for example to 1,2-ethanediamine, 1,6-hexamethylenediamine, 1-amino-3,3,5-trimethyl-5-aminomethylcyclohexane (isophoronediamine), piperazine 1,4-diaminocyclohexane, bis(4-aminocyclohexyl)methane, adipic dihydrazide or diethylenetriamine, optionally incombination with hydrazine or hydrazine hydrate.

Further suitable polyamines include polyether polyamines which come about formally by replacement of the hydroxyl groups of the above-described polyether polyols by amino groups. Polyether polyamines of this kind can be prepared by reacting the corresponding polyether polyols with ammonia and/or primary amines.

Particularly preferred synthesis components v) are 1-amino-3,3,5-trimethyl-5-aminomethylcyclohexane (isophoronediamine), 1,2-ethanediamine, piperazine and diethylenetriamine.

The polyester-polyurethane resin dispersions of the invention contain, based on solids, from 1.5 to 30, preferably from 3 to 13.5 mmol of alkali metal salts of sulphonic acids/100 g of polyurethane resin. The incorporation of ionic groups of this kind is accomplished conventionally by using synthesis components vi), such as diamines or polyamines containing alkali metal sulphonate groups, for example, when synthesizing the polyurethane resins of the invention. Examples of suitable compounds vi) are the alkali metal salts of N-(2-aminoethyl)-2-aminoethane-sulphonic acid. The sodium salt is preferred. It is of course also possible to incorporate the free sulphonic acids during the isocyanate polyaddition operation. These acids must then be neutralized before the polyurethane resins are transferred to water, neutralization being effected for example by addition of alkali metal hydroxides, alkali metal hydrogencarbonates or alkali metal carbonates.

Normally, component i) is used in an amount of from 20 to 94.5 parts, preferably 30 to 80 parts and more preferably 50 to 76.5 parts by weight, component ii) is used in an amount of from 0 to 30%, preferably 0 to 15% by weight, component iii) is used in an amount of from 0 to 10 parts, preferably 0.5 to 6 parts by weight, component iv) is used in an amount of from 4.5 to 50 parts, preferably 5 to 30 parts and more preferably 7.5 to 20 parts by weight, component v) is used in an amount of from 0.5 to 13 parts, preferably 1 to 5 parts by weight and component vi) is used in an amount of from 0.5 to 8 parts, preferably 1.5 to 5.5 parts, with the proviso that the sum of the components totals 100% by weight.

The polyurethane resin dispersions of the invention are prepared by the acetone method (D. Dieterich in Houben-Weyl: Methoden der Organischen Chemie, Volume E20, pp. 1670-81 (1987)).

In the acetone method the synthesis of the aqueous formulations of polyurethane resins on which the dispersions of the invention are based takes place in a multi-stage operation.

In a first stage a prepolymer containing isocyanate groups is synthesized from the synthesis components i) to iv). The amounts of the individual components used are such as to give an isocyanate index of 1.1 to 3.5, preferably 1.3 to 2. The isocyanate content of the prepolymers is between 1.5% and 7.5%, preferably between 2% and 4.5% and more preferably between 2.5% and 3.5%. It should also be ensured when selecting the amount of synthesis components i) to iv) that the arithmetic, number-average functionality is situated between 1.80 and 3.50, preferably between 1.95 and 2.25.

In a second stage the prepolymer prepared in stage 1 is dissolved in an organic solvent at least partly miscible with water and carrying no isocyanate-reactive groups. A preferred solvent is acetone. It is also possible, though, to use other solvents, such as 2-butanone, tetrahydrofuran or dioxane or mixtures of these solvents. The amounts of solvent to be used are to be such that the resulting solids content is from 20% to 80%, preferably from 30% to 50%, more preferably from 35% to 45% by weight.

In a third stage the isocyanate-containing prepolymer solution is reacted with mixtures of the amino-functional synthesis components v) to vi), with chain extension, to form the high molecular weight polyurethane resin. The amounts of the synthesis components are such that for each mole of isocyanate groups in the dissolved prepolymer there are 0.3 to 0.93 mol, preferably 0.5 to 0.85 mol, of primary and/or secondary amino groups in synthesis components v) to vi). The arithmetic, number-average isocyanate functionality of the resulting polyester-polyurethane resin of the invention is between 1.55 and 3.10, preferably between 1.90 and 2.35. The number-average molecular weight is between 4500 and 250 000, preferably between 10 000 and 80 000 daltons.

In a fourth stage the high molecular weight polyurethane resin is precipitated, by adding water to the solution, in the form of a fine dispersion.

Incorporated, free sulphonic acid groups are optionally neutralized between the third and fourth steps.

In a fifth stage the organic solvent, optionally under reduced pressure, is distilled off completely or partially. The amount of water in stage four is such that the aqueous polyester-polyurethane resin dispersions of the invention have a solids content of 30% to 65%, preferably from 35% to 55% by weight.

The coating compositions comprising the polyester-polyurethane resin dispersions of the invention can be used as aqueous soft feel coating materials, being distinguished by outstanding adhesion not only to various substrate surfaces, preferentially plastics substrates, but also to subsequent coating films, by improved condensation resistance and solvent resistance of the coating system as a whole, and by their extremely low VOC.

The present invention therefore likewise provides coating compositions comprising:

a) 15 to 45 parts by weight (and preferably from 25 to 37.5 parts, and more preferably 30 to 35 parts) of an aqueous polyester-polyurethane resin dispersion of the invention,
b) 15 to 45 parts by weight (and preferably 25 to 37.5 parts, and more preferably 30 to 35 parts) of a hydroxy-functional, aqueous or water-dilutable binder,
c) 0 to 60 parts by weight (and preferably 4 to 45 parts, and more preferably 7.5 to 30 parts) of inorganic fillers and/or matting agents,
d) 1 to 60 parts by weight (and preferably 2.5 to 30 parts, and more preferably 4 to 20 parts) of a polyisocyanate,
e) 0.1 to 30 parts by weight preferably (and preferably 5 to 25 parts, and more preferably 10 to 20) parts of pigments and
f) 1 to 15 parts by weight (and preferably 1.5 to 10 parts, and more preferably 2 to 6 parts) of customary coatings auxiliaries, with the sum of the components totaling 100.

Suitable coating-composition components b) are hydroxy-functional polymers from the classes of the polyesters, polyurethanes and polyacrylates and/or copolymers or graft polymers of the stated polymer types, as described for example in EP-A 0 542 105. Particularly preferred formulations are aqueous or water-thinnable formulations of hydroxy-functional polyurethanes or polyacrylates or graft polymers of acrylates on polyurethanes. Particular preference is given to aqueous or water-thinnable formulations of hydroxy-functional polyurethanes of the polyester polyurethane type.

As coating-composition components d) use is made of polyisocyanates containing free NCO groups. Suitable such compounds are for example those based on isophorone diisocyanate, hexamethylene diisocyanate, 1,4-diisocyanatocyclohexane, bis(4-isocyanatocyclohexane)methane or 1,3-diisocyanatobenzene or based on paint polyisocyanates such as polyisocyanates containing allophanate, uretdione, biuret or isocyanurate groups and derived from 1,6-diisocyanatohexane, isophorone diisocyanate or bis(4-isocyanatocyclohexane)methane, or paint polyisocyanates containing urethane groups and based on 2,4- and/or 2,6-diisocyanatotoluene or isophorone diisocyanate on the one hand and on low molecular weight polyhydroxyl compounds such as trimethylolpropane, the isomeric propanediols or butanediols, or any desired mixtures of such polyhydroxyl compounds, on the other.

Preferred coating-composition components d) are low-viscosity, hydrophobic or hydrophilicized polyisocyanates containing free isocyanate groups and based on aliphatic, cycloaliphatic, araliphatic and/or aromatic isocyanates, particular preference being given to aliphatic or cycloaliphatic isocyanates. These polyisocyanates have at 23° C. in general a viscosity of 10 to 3500 mPas. If necessary the polyisocyanates can be employed as a blend with small amounts of inert solvents, in order to lower the viscosity to a figure within the stated range.

Triisocyanatononane can also be used, alone or in mixtures, as a crosslinker component. Water-soluble and/or dispersible polyisocyanates are obtainable for example by modification with carboxylate, sulphonate and/or polyethylene oxide groups and/or polyethylene oxide/polypropylene oxide groups.

Hydrophilicization of the polyisocyanates is possible for example by reaction with deficit amounts of monohydric hydrophilic polyether alcohols. The preparation of hydrophilicized polyisocyanates of this kind is described for example in EP-A 0 540 985. Also highly suitable are the polyisocyanates containing allophanate groups that are described in EP-A 0 959 087, which are prepared by reacting polyisocyanates of low monomer content with polyethylene oxide polyether alcohols under allophanatisation conditions. Also suitable are the water-dispersible polyisocyanate mixtures described in DE-A 10 007 821, based on triisocyanatononane, and also polyisocyanates hydrophilicized with ionic groups (sulphonate groups, phosphonate groups), as described for example in DE-A 10 024 624. Hydrophilicization through addition of commercially customary emulsifiers is also a possibility.

The use of hydrophilically modified polyisocyanates as a coating-composition component d) is preferred. Particular preference is given to polyisocyanates modified with sulphonate groups, as described for example in DE-A 10 024 624 p. 3 line 22 to p. 5 line 34 and p. 6 line 40 to p. 7 line 50 and p. 9 line 38 to line 50. In principle it is of course also possible to use mixtures of different crosslinker resins.

The polyester-polyurethane resin dispersions of the invention can be used for coating substrates.

Suitable substrates are plastics substrates, examples being styrene copolymers such as ASA (acrylonitrile-styrene-acrylate) or ASA blends, ABS (acrylonitrile-butadiene-styrene), ABS blends, such as ABS polycarbonate, polycarbonate (PC) and also PC/PBTP (polycarbonate/polybutylene terephthalate), PA (polyamide) and also PA/ABS blends or polyurethanes which have been prepared by RIM (=Reaction Injection Moulding) or RRiM (=Reinforced RIM) operations. Further suitable substrates are wood, metal, leather or textiles.

Likewise provided by the present invention are plastics substrates coated with coating compositions comprising the polyester-polyurethane dispersions of the invention.

The invention additionally provides a coating system comprising a substrate, one or more coating films, characterized in that at least one of the coating films comprises the polyester-polyurethane resin dispersions of the invention. Preference is given to a single-coat system.

EXAMPLES

Unless indicated otherwise all percentages are by weight.

Viscosity measurements were conducted using a cone-plate viscometer Pysica Viscolab LC3 ISO from Physica, Stuttgart, Germany in accordance with DIN 53019, with a shear rate of 40 s$^{-1}$.

The mean particle size was determined by laser correlation spectroscopy (Zetasizer® 1000, Malvern Instruments, Herrenberg, Germany).

The stated OH numbers were calculated starting from the monomers employed.

Acid numbers: determination method DIN ISO 3682.

I) General Preparation Instructions for Polyesters

A 5 l reaction vessel with stirrer, heating jacket, thermometer, distillation column and nitrogen inlet is charged with the acid components, which are melted at 160° C. under a nitrogen flow of 10-12 l/h. Subsequently the stirrer is switched on, the diol components are added and the nitrogen flow is reduced to 7-8 l/h. The reaction mixture is slowly heated to 200° C. The heating rate is regulated so that the overhead column temperature does not exceed 105° C. The reaction mixture is held at 200° C. until the overhead column temperature falls below 90° C. Then the column is removed and the nitrogen stream is slowly increased to 30-32 l/h.

Stirring is continued under these reaction conditions until an acid number of less than 1 is reached.

| I.1 Polyester A | |
|---|---|
| Adipic acid | 7.1 mol = 1036.6 g |
| 1,6-hexanediol | 5.4 mol = 637.2 g |
| Neopentyl glycol | 2.7 mol = 280.8 g |
| Water | −14.2 mol = 255.6 g |
| Ester | 1.0 mol = 1699.0 g |

OH—N = 66.0 mg KOH/g

| I.2 Polyester B | |
|---|---|
| Phthalic anhydride | 7.66 mol = 1133.7 g |
| 1,6-hexanediol | 8.66 mol = 1021.9 g |
| Water | −7.66 mol = 137.9 g |
| Ester | 1.00 mol = 2015.0 g |

OH—N = 55.7 mg KOH/g

| I.3 Polyester C | |
|---|---|
| Adipic acid | 2.9 mol = 423.4 g |
| Phthalic anhydride | 10.0 mol = 1480.0 g |
| 1,6-hexanediol | 13.3 mol = 1569.4 g |
| Neopentyl glycol | 1.3 mol = 134.2 g |
| Water | −15.8 mol = 284.4 g |
| Ester | (1.7 mol) = 3322.6 g |

OH—N = 57.4 mg KOH/g

| II. Coating-composition component | |
|---|---|
| Bayhydrol ® XP 2429: | aqueous, hydroxy-functional polyester polyurethane dispersion (Bayer AG, Leverkusen, DE) |
| Solids content: | 55% by weight in water/NMP |
| Hydroxyl content: | 0.8% by weight |

Example 1

Comparative (in Analogy to Example 1 from DE-A 2 651 506)

1632 parts of polyester (A) are dewatered at 100° C. under a reduced pressure of approximately 14 torr and, following addition of 85 parts of a polyether monoalcohol formed from n-butanol, ethylene oxide and propylene oxide (in a molar ratio of 83:17) with an OH number of 30, a mixture of 244.2 parts of 1-isocyanato-3,3,5-trimethyl-5-isocyanatomethylcyclohexane (isophorone diisocyanate, Desmodur® I, Bayer AG Leverkusen) and 185 parts of hexane 1,6-diisocyanate (Desmodur® H, Bayer AG Leverkusen) is added. The resulting mixture is stirred at 100° C. until it has an isocyanate content of 4.6% (theoretical=4.78%). After cooling has taken place to 50-60° C., 3200 parts of anhydrous acetone are added. Introduced into this acetone solution, slowly and with stirring, is a mixture of 107 parts of 1-amino-3,3,5-trimethyl-5-aminomethylcyclohexane, 13.3 parts of sodium N-(2-aminoethyl)-2-aminoethanesulphonate and 10 parts of hydrazine monohydrate, in solution in 260 parts of water. After 10 minutes of subsequent stirring, 3380 parts of water are introduced slowly but with vigorous stirring. A bluish white dispersion of the solid is formed in a mixture of water and acetone. Removal of the acetone by distillation leaves an aqueous dispersion having a solids content of 40±1% by weight. Measurement of the particle diameter by laser correlation gives a figure of approximately 230 nm.

The solids of the dispersion contains 2.9% of polyethylene oxide segments and 3.1 mmol of sulphonate groups ($-SO_3^-$) per 100 g of solids.

The fraction of aromatic carboxylic acid groups relative to all of the carboxylic acid groups of synthesis component i) is 0% by weight.

Example 2

Comparative

A mixture of 1275 parts of polyester (A) and 500 parts of polyester (B) is dewatered at 110° C. under reduced pressure of about 14 torr and then at 70° C. 300.7 parts of hexane 1,6-diisocyanate (Desmodur® H, Bayer AG Leverkusen) are added. The mixture is stirred at 100° C. until it has an isocyanate content of 3.00% (theoretical=3.20%). After cooling has taken place to 50-60° C. 3690 parts of anhydrous acetone are added. Incorporated slowly with stirring into this acetone solution is a mixture of 42.75 parts of sodium N-(2-aminoethyl)-2-aminoethanesulphonate and 17.4 parts of ethylenediamine, in solution in 390 parts of water. After subsequent stirring for 10 minutes 2850 parts of water are introduced with slow but vigorous stirring. A bluish white dispersion of the solid is formed in a mixture of water and acetone. Removal of the acetone by distillation leaves an aqueous dispersion.

The solids content is adjusted by adding water to 40±1% by weight. Measurement of the particle diameter by laser correlation gave a figure of approximately 94 nm.

The solids of the dispersion contains 10.3 mmol of sulphonate groups ($-SO_3^-$) per 100 g of solids.

The fraction of aromatic carboxylic acid groups, relative to all of the carboxylic acid groups of synthesis component i) is 26.5 mol %.

Example 3

Comparative

A mixture of 850 parts of polyester (A) and 1000 parts of polyester (B) is dewatered at 110° C. under reduced pressure of about 14 torr and then at 70° C. 300.7 parts of hexane 1,6-diisocyanate (Desmodur® H, Bayer AG Leverkusen) are added. The mixture is stirred at 100° C. until it has an isocyanate content of 2.79% (theoretical=3.08%). After cooling has taken place to 50-60° C., 3800 parts of anhydrous acetone are added. Incorporated slowly with stirring into this acetone solution is a mixture of 42.75 parts of sodium N-(2-aminoethyl)-2-aminoethanesulphonate and 17.4 parts of ethylenediamine, in solution in 390 parts of water. After subsequent stirring for 10 minutes 2950 parts of water are introduced with slow but vigorous stirring. A bluish white dispersion of the solid is formed in a mixture of water and acetone. Removal of the acetone by distillation leaves an aqueous dispersion.

The solids content is adjusted by adding water to 40±1% by weight. Measurement of the particle diameter by laser correlation gave a figure of approximately 103 nm.

The solids of the dispersion contains 10.3 mmol of sulphonate groups ($-SO_3^-$) per 100 g of solids.

The fraction of aromatic carboxylic acid groups, relative to all of the carboxylic acid groups of synthesis component i) is 51.9 mol %.

Example 4

Inventive

A mixture of 425 parts of polyester (A) and 1500 parts of polyester (B) is dewatered at 110° C. under reduced pressure of about 14 torr and then at 70° C. 300.7 parts of hexane 1,6-diisocyanate (Desmodur® H, Bayer AG Leverkusen) are added. The mixture is stirred at 100° C. until it has an isocyanate content of 2.74% (theoretical=2.98%). After cooling has taken place to 50-60° C. 3955 parts of anhydrous acetone are added. Incorporated slowly with stirring into this acetone solution is a mixture of 42.75 parts of sodium N-(2-aminoethyl)-2-aminoethanesulphonate and 17.4 parts of ethylenediamine, in solution in 390 parts of water. After subsequent stirring for 10 minutes 3050 parts of water are introduced with slow but vigorous stirring. A bluish white dispersion of the solid is formed in a mixture of water and acetone. Removal of the acetone by distillation leaves an aqueous dispersion.

The solids content is adjusted by adding water to 40±1% by weight.

Measurement of the particle diameter by laser correlation gave a figure of approximately 159 nm.

The solids of the dispersion contains 9.9 mmol of sulphonate groups ($-SO_3^-$) per 100 g of solids.

The fraction of aromatic carboxylic acids as a proportion of the synthesis component i) is 76.4 mol %.

Example 5

Inventive 2000 parts of polyester (B) are dewatered at 110° C. under reduced pressure of about 14 torr and then at 70° C. 300.7 parts of hexane 1,6-diisocyanate (Desmodur® H, Bayer AG Leverkusen) are added. The mixture is stirred at 100° C. until it has an isocyanate content of 2.67% (theoretical=2.88%). After cooling has taken place to 50-60° C. 4040 parts of anhydrous acetone are added. Incorporated slowly with stirring into this acetone solution is a mixture of 47.5 parts of sodium N-(2-aminoethyl)-2-aminoethanesulphonate and 17.4 parts of ethylenediamine, in solution in 400 parts of water. After subsequent stirring for 10 minutes 3150 parts of water are introduced with slow but vigorous stirring. A bluish white dispersion of the solid is formed in a mixture of water and acetone. Removal of the acetone by distillation leaves an aqueous dispersion.

The solids content is adjusted by adding water to 40±1% by weight.

Measurement of the particle diameter by laser correlation gives a figure of approximately 220 nm.

The solids of the dispersion contains 10.5 mmol of sulphonate groups ($-SO_3^-$) per 100 g of solids.

The fraction of aromatic carboxylic acid groups relative to all of the carboxylic acid groups of synthesis component i) is 100 mol %.

Example 6

Inventive 1955 parts of polyester (C) are dewatered at 100° C. under a reduced pressure of approximately 14 torr and, following addition of 92.5 parts of a polyether monoalcohol formed from n-butanol, ethylene oxide and propylene oxide (in a molar ratio of 83:19) with an OH number of 30, a mixture of 254.2 parts of 1-isocyanato-3,3,5-trimethyl-5-isocyanatomethylcyclohexane (isophorone diisocyanate, Desmodur® I, Bayer AG, Leverkusen) and 192.7 parts of hexane 1,6-diisocyanate (Desmodur® H, Bayer AG Leverkusen) is added. The resulting mixture is stirred at 100° C. until it has an isocyanate content of 4.23% (theoretical=4.28%). After cooling has taken place to 50-60° C. 3740 parts of anhydrous acetone are added. Introduced into this acetone solution, slowly and with stirring, is a mixture of 111.5 parts of 1-amino-3,3,5-trimethyl-5-aminomethylcyclohexane, 14.2 parts of sodium N-(2-aminoethyl)-2-aminoethanesulphonate and 10.4 parts of hydrazine monohydrate, in solution in 280 parts of water. After 10 minutes of subsequent stirring 3660 parts of water are introduced slowly but with vigorous stirring. A bluish white dispersion of the solid is formed in a mixture of water and acetone. Removal of the acetone by distillation leaves an aqueous dispersion.

The solids content was adjusted by adding water to 40+1% by weight.

Measurement of the particle diameter by laser correlation gave a figure of approximately 160 nm.

The solids of the dispersion contains 2.75% of polyethylene oxide segments and 2.9 mmol of sulphonate groups ($-SO_3^-$) per 100 g of solids.

The fraction of aromatic polycarboxylic acids as a proportion of synthesis component i) is 76.4 mol %.

Example 7

Inventive 2000 parts of polyester (B) are dewatered at 110° C. under reduced pressure of about 14 torr and then at 90° C. 485 parts of 4,4'-diisocyanatocyclohexylmethane (Desmodur® W, Bayer AG Leverkusen) are added. The mixture is stirred at 115° C. until it has an isocyanate content of 2.71% (theoretical=2.87%). After cooling has taken place to 50-60° C. 4420 parts of anhydrous acetone are added. Incorporated slowly with stirring into this acetone solution is a mixture of 62.7 parts of sodium N-(2-aminoethyl)-2-aminoethanesulphonate and 21 parts of ethylenediamine, in solution in 540 parts of water. After subsequent stirring for 10 minutes 3350 parts of water are introduced with slow but vigorous stirring. A bluish white dispersion of the solid is formed in a mixture of water and acetone. Removal of the acetone by distillation leaves an aqueous dispersion.

The solids content is adjusted by adding water to 40±1% by weight. Measurement of the particle diameter by laser correlation gives a figure of approximately 230 nm.

The solids of the dispersion contains 12.8 mmol of sulphonate groups ($-SO_3^-$) per 100 g of solids.

The fraction of aromatic carboxylic acid groups relative to all of the carboxylic acid groups of synthesis component i) is 100 mol %.

III. Applications Section

III.1 Single-Coat Aqueous 2K Soft Feel Coating Material

TABLE 1

Figures refer to parts by weight.

| Coating formulation | A | B | C | D | E | F |
|---|---|---|---|---|---|---|
| | comparative | | | inventive | | |
| Example 1 | 110 | | | | | |
| Example 2 | | 110 | | | | |
| Example 3 | | | 110 | | | |
| Example 4 | | | | 110 | | |
| Example 5 | | | | | 110 | |

TABLE 1-continued

Figures refer to parts by weight.

| Coating formulation | A | B | C | D | E | F |
|---|---|---|---|---|---|---|
| | comparative | | | inventive | | |
| Example 6 | | | | | | 110 |
| Bayhydrol ® XP 2429[1] | 100 | 100 | 100 | 100 | 100 | 100 |
| Water | 90 | 90 | 90 | 90 | 90 | 90 |
| Byk ® 348[2] | 0.8 | 0.8 | 0.8 | 0.8 | 0.8 | 0.8 |
| Tegowet ® KL245[3] (50% in water) | 1.1 | 1.1 | 1.1 | 1.1 | 1.1 | 1.1 |
| Aquacer ® 535[2] | 5.6 | 5.6 | 5.6 | 5.6 | 5.6 | 5.6 |
| Sillitin ® Z86[4] | 12.7 | 12.7 | 12.7 | 12.7 | 12.7 | 12.7 |
| Pergopak ® M3[5] | 19.1 | 19.1 | 19.1 | 19.1 | 19.1 | 19.1 |
| Talc IT extra[6] | 6.4 | 6.4 | 6.4 | 6.4 | 6.4 | 6.4 |
| Bayferrox ® 318M[1] | 50.8 | 50.8 | 50.8 | 50.8 | 50.8 | 50.8 |
| Matting agent OK412[7] | 6.4 | 6.4 | 6.4 | 6.4 | 6.4 | 6.4 |
| Bayhydur ® 3100[1] (75% in methoxypropyl acetate) | 22.7 | 22.7 | 22.7 | 22.7 | 22.7 | 22.7 |

[1]Bayer AG, Leverkusen, DE
[2]BYK-Chemie, Wesel, DE
[3]TegoChemie Service, Essen, DE
[4]Hoffmann & Söhne, Neuburg, DE
[5]Deuteron GmbH, Achim, DE
[6]Norwegian Talc, Frankfurt a. M., DE
[7]Degussa, Frankfurt a. M., DE III.2 Adhesion to Plastics Substrate The single-coat topcoat formulations of table 1 are applied by spraying (3-5 bar, nozzle size 1.4, dry film thickness about 30 µm) to plastics sheets measuring 148×102×3 mm. Prior to spray application the coating materials are adjusted to spray viscosity (25-30 s in ISO 5). The specimens are dried at room temperature for 10 minutes and at 80° C. for 30 minutes. The adhesion is assessed by means of cross-cut. The evaluation was made visually in stages from 0 to 5, with 0 denoting no detachment and 5 complete detachment (DIN 53 151 with adhesive tape removal).

III.2.1 Adhesion by Cross-Cut

TABLE 2

Evaluation of the cross-cut

| | Example | | | | | |
|---|---|---|---|---|---|---|
| | Comparative | | | Inventive | | |
| | A | B | C | D | E | F |
| Bayblend ® T65MN[1] | 1 | 2 | 1 | 0 | 0 | 0 |
| Novodur ® PKT[1] | 3 | 4 | 1 | 2 | 0 | 1 |
| Pocan ® S1506[1] | 1 | 2 | 2 | 1 | 0 | 1 |
| Durethan ® BC304[1] | 5 | 5 | 5 | 3 | 1 | 2 |

[1]Bayer AG, Leverkusen, DE

It can be seen that the inventive examples have significantly better adhesion to the problem substrates tested than the coatings according to the prior art.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing polyester-polyurethane dispersions comprising:
   A) reacting
      i) one or more polyol components having a number average molecular weight of at least 300 daltons, at least 60% by weight of component i) being a polyester polyol with the fraction of aromatic carboxylic acid groups relative to all of the carboxylic acid groups used to prepare said polyester polyol being at least 60 mol %,
   ii) optionally one or more polyol components having a number average molecular weight of 62 to 299 daltons, and
   iii) optionally a compound which is monofunctional for the purposes of the isocyanate polyaddition reaction and has an ethylene oxide content of at least 50% by weight and a number average molecular weight of at least 400 daltons, with
   iv) a polyisocyanate to form a prepolymer,
B) dissolving the prepolymer in an organic solvent,
C) reacting the prepolymer with v) one or more aliphatic and/or alicyclic primary and/or secondary polyamines having a number average molecular weight of 60 to 300 daltons, said polyamine optionally being in combination with hydrazine or hydrazine hydrate, and vi) a hydrophilicized aliphatic diamine,
D) precipitating the product from C) by adding water to form a dispersion, and
E) removing the organic solvent.

2. The process according to claim 1, wherein the fraction of aromatic carboxylic acid groups, relative to all of the carboxylic acid groups used to prepare the polyester component, in the polyol component i) is at least 70 mol %.

3. The process according to claim 1, wherein the fraction of aromatic carboxylic acid groups, relative to all of the carboxylic acid groups used to prepare the polyester component, in the polyol component i) is at least 80 mol %.

4. A polyester-polyurethane resin dispersion dispersions obtained according to the process of claim 1.

5. A coating system comprising a substrate and one or more coating films, wherein at least one of the coating films comprises the polyester-polyurethane resin dispersion according to claim 4.

6. A coating composition comprising
   a) 15 to 45 parts by weight of the aqueous polyester-polyurethane resin dispersion of claims 4,
   b) 15 to 45 parts by weight of a hydroxy-functional, aqueous or water-dilutable binder,
   c) 0 to 60 parts by weight of inorganic fillers and/or matting agents,
   d) 1 to 60 parts by weight of a polyisocyanate,
   e) 0.1 to 30 parts by weight preferably parts of pigments and
   f) 1 to 15 parts by weight of customary coatings auxiliaries,
with the sum of the components totaling 100.

7. The coating composition according to claim 6, wherein
   a) the aqueous polyester-polyurethane resin dispersion is present in an amount of 25 to 37.5 parts by weight,
   b) the hydroxy-functional, aqueous or water-dilutable binder is present in an amount of 25 to 37.5 parts by weight,
   c) the inorganic fillers and/or matting agents are present in an amount of 4 to 45 parts by weight,
   d) the polyisocyanate is present in an amount of 2.5 to 30 parts by weight,
   e) the pigment(s) is present in an amount of 5 to 25 parts by weight and
   f) the customary coatings auxiliaries are present in an amount of 1.5 to 10 parts by weight,
with the sum of the components totaling 100.

8. The coating composition according to claim 6, wherein
   a) the aqueous polyester-polyurethane resin dispersion is present in an amount of 30 to 35 parts by weight,
   b) the hydroxy-functional, aqueous or water-dilatable binder is present in an amount of 30 to 35 parts by weight,
   c) the inorganic fillers and/or matting agents are present in an amount of 7.5 to 30 parts by weight,
   d) the polyisocyanate is present in an amount of 4 to 20 parts by weight,
   e) the pigment(s) is present in an amount of 10 to 20 parts by weight and
   f) the customary coatings auxiliaries are present in an amount of 2 to 6 parts by weight,
with the sum of the components totaling 100.

* * * * *